United States Patent [19]
Birchall et al.

[11] 3,772,060
[45] Nov. 13, 1973

[54] PRE-TREATMENT OF METAL SUBSTRATES WITH COMPLEX HALOGEN-CONTAINING PHOSPHATES OF ALUMINUM

[75] Inventors: James Derek Birchall; John Edward Cassidy, both of Runcorn, England

[73] Assignee: Imperial Chemical Industries Limited, London, England

[22] Filed: Nov. 29, 1971

[21] Appl. No.: 203,022

[30]     Foreign Application Priority Data
   Dec. 11, 1970   Great Britain................... 59,044/70

[52] U.S. Cl...................... 117/69, 117/49, 117/74, 117/75, 117/127, 148/6.15 R, 148/6.27
[51] Int. Cl................................................. B44d 1/14
[58] Field of Search...................... 148/6.15 R, 6.27; 117/69, 75, 74, 49, 127

[56]          References Cited
         UNITED STATES PATENTS
2,743,203   4/1956   Steinherz ...................... 148/6.15 R
3,489,595   1/1970   Brown, Jr. ............................ 117/75

*Primary Examiner*—Cameron K. Weiffenbach
*Attorney*—Cushman, Darby & Cushman

[57]         ABSTRACT

Pre-treatment of a metal, especially aluminum or zinc, prior to painting, by means of a complex halogen-containing phosphorus or aluminum containing chemically-bound molecules of water and/or an organic hydroxy compound. The preferred complex phosphate contains ethyl alcohol molecules and has an empirical formula of $AlPClH_{25}C_8O_8$, and is most conveniently used in solution in methyl alcohol or ethyl alcohol.

9 Claims, No Drawings

PRE-TREATMENT OF METAL SUBSTRATES WITH COMPLEX HALOGEN-CONTAINING PHOSPHATES OF ALUMINUM

BRIEF SUMMARY OF THE INVENTION

This invention relates to a coating process, and more particularly to a coating process in which a phosphate derivative is used to prepare the surface of a substrate before application of a coating composition.

According to the present invention we provide a coating process in which a coating composition is applied to a metal substrate which has been treated with a complex halogen-containing phosphate of aluminium containing at least one chemically-bound molecule of a hydroxy compound R—OH wherein R is a hydrogen atom or an organic group.

DETAILED DESCRIPTION

The complex phosphates of aluminium which may be used for the purposes of the present invention may be made by the methods described in our co-pending application Ser. No. 274,964 filed July 25, 1973 which is a continuation of application Ser. No. 42,499 filed June 1, 1970, now abandoned, both applications commonly owned U.S. applications. The disclosure of application Ser. No. 274,964 is incorporated herein by reference.

Where R is an organic group, it is preferred that it be an aliphatic hydrocarbon group or a substituted aliphatic hydrocarbon group, for example wherein the substituent is one or more of the following: amino, phenyl, hydroxyl, carboxyl or alkoxy. Unsubstituted aliphatic alcohols are especially preferred as the hydroxy compound since complex phosphates containing them are easily separated solids obtainable in high yield. We have found that aliphatic alcohols containing one to ten carbon atoms are especially suitable, and owing to their ready availability we prefer to use aliphatic alcohols containing from one to four carbon atoms, for example methanol, ethyl alcohol, n-propyl alcohol or isopropyl alcohol.

The halogen in the halogen-containing complex phosphate of aluminium is preferably chlorine, but the compounds may contain other halogens, for example bromine or iodine. The term "phosphate" includes acid phosphates.

The ratio of the number of gram atoms of aluminium to the number of gram atoms of phosphorus in the complex phosphates of aluminium may vary over a wide range, for example from 1:1 to 2:1, but is preferably substantially 1:1 as complex phpsphates having this ratio decompose at low temperatures directly to form aluminium orthophosphate having greater chemical stability and refractoriness than aluminium phosphate formed from complex phosphates with other ratios. The ratio of the number of gram atoms of aluminium to the number of gram atoms of halogen in the complex phosphates is preferably substantially 1:1.

The complex phosphates may be monomeric or polymeric.

The monomeric forms, or the repeating units of the polymeric forms of the complex phosphates may contain, for example from one to five molecules of the hydroxy compound. Most frequently the number of molecules of the hydroxy compound is four. In some cases the complex phosphates may contain molecules of different hydroxy compounds, for example they may contain both chemically-bound water and a chemically-bound organic hydroxy compound, the total number of such molecules being, for example, from two to five.

Examples of complex phosphates include:

a. that containing ethyl alcohol and having the empirical formula $AlPClH_{25}C_8O_8$. The infra-red and X-ray characteristics of the compound are described in Example 1 of the aforesaid co-pending application. It is designated aluminium chlorophosphate ethanolate, and for convenience is referred to herein as ACPE;

b. that having the empirical formula $AlPClH_{11}O_9$. The infra-red and X-ray characteristics of the compound are described in Example 6 of the aforesaid co-pending application. It is designated aluminium chlorophosphate hydrate, and for convenience is referred to as ACPH;

c. that containing bromine and ethyl alcohol having an empirical formula $AlPBrH_{25}C_8O_8$. The infra-red and X-ray characteristics of the compound are described in Example 7 of the aforesaid co-pending application. It is designated aluminium bromophosphate ethanolate, and for convenience is referred to as ABPH.

It is to be understood, however, that these designations in no way imply any particular molecular structures for the compounds.

The complex phosphates and their solutions are preferably prepared by reacting aluminium halide with a hydroxy compound R-OH and phosphoric acid, or a compound capable of forming phosphoric acid. The preparation is preferably carried out at a temperature between 0°C and 50°C. A complex phosphate in which R-OH is water can be made by treating complex phosphates in which R-OH is an organic hydroxy compound with water.

The metal substrate may be in any desired form, for example fibres, films, sheets, massive form or manufactured objects.

The process is especially applicable to aluminium, zinc or alloys of either or both of these metals.

The treatment of the surface of the substrate with the complex phosphate of aluminium may be carried out by applying a composition (conveniently referred to hereafter as a "priming composition") comprising the complex phosphate dissolved or dispersed in a solvent or vehicle.

It is preferred to use a polar solvent for the complex phosphate in the priming compositions applied to the surface, for example methyl alcohol, ethyl alcohol, isopropyl alcohol, butyl alcohol, ethylene glycol monoethyl ether or water, or a mixture of two or more such solvents. Solutions of ACPE in water or an alcohol, for example isopropyl alcohol, or in an alcohol/chloroform mixture, or of ACPH in water are especially useful as priming compositions for the method of the invention.

For some embodiments it is preferred that the priming composition applied to the surface comprises additionally a surface-active agent, for example sodium lauryl sulphate, cetyl pyridinium bromide or polyethylene oxide condensates.

Preferred priming compositions may contain an organic polymer soluble in the solvent of the composition, preferably an organic polymer which is thermally stable at a temperature of 120°C, more preferably an organic polymer which is thermally stable at 200°C. Examples of useful organic polymers include polymethyl methacrylate, hydroxypropyl cellulose, epoxy resin, urea formaldehyde resin or organo-silanes. The polymer may be produced in situ in the composition by including the appropriate monomer in the priming composition and polymerising it by any convenient method, for example irradiation by ultraviolet light, free-radical initiation or heating.

Optionally, the priming compositions may contain additives which modify the structure of the aluminium phosphate deposited on the surface, for example boric acid esters and ethers, ethyl silicate and organic compounds of metals such as titanium, zirconium or tin.

The relative proportions of the components of the priming compositions used in the process may vary widely depending, for example, upon the method employed for applying the composition to the substrate surface. The compositions preferably contain at least 0.1 percent by weight of complex phosphate, more preferably from 1 percent by weight to 30 percent by weight. If the composition contains a surface-active agent, this may be present in any proportion necessary to achieve satisfactory wetting and spreading of the composition on the substrate surface, but we find that normally 0.05 percent to 1 percent by weight is sufficient. Priming compositions especially convenient for the process of the invention have proportions in parts by weight in the following ranges:

complex phosphate — 2–15
solvent — 100–85

The following table shows a number of typical compositions in which proportions are shown as parts by weight:

| Composition | A | B | C | D | E | F |
|---|---|---|---|---|---|---|
| complex phosphate | 2 | 2 | 2 | 5 | 15 | 25 |
| solvent | 100 | 100 | 100 | 95 | 85 | 75 |
| wetting agent | | 0.1 | 0.1 | 0.1 | 0.75 | 0.2 |
| organic polymer | | 2 | | 3 | | |
| boric acid ester | 0.2 | | | 0.5 | | |
| ethyl silicate | | | 0.2 | | | 2.5 |
| organo-metallic additive | | | | | 1 | |

The compositions used in the process may conveniently be prepared by mixing the ingredients together; in some embodiments it may be preferable to formulate a concentrate of a composition which may be diluted with the solvent or other appropriate thinner before use.

The priming composition may be applied to the substrate surface by any convenient method, for example dipping, spraying or brushing.

It is preferred that the application of the composition be carried out in an atmosphere having a relative humidity of less than 50 percent. When dipping is used, we prefer to immerse the substrate in the composition and withdraw it slowly.

Removal of solvent is preferably brought about by drying, either by heating the applied composition and/or subjecting it to a vacuum. Low boiling solvents such as methanol may be removed readily by standing the substrate to which the composition has been applied in warm air. When water comprises the solvent, drying in an oven at a temperature of at least 100°C is convenient.

The deposited coating is preferably heated, conveniently after removal of the solvent, to form aluminium phosphate or a deposit containing aluminium phosphate. The duration of the heating is preferably at least 10 minutes. The form of aluminium phosphate will depend, amongst other things, upon the temperature to which the coating is heated, although a temperature of at least 80°C is sufficient to form a coat of aluminium phosphate. Temperatures as low as 50°C may be used but decomposition of the complex may be undesirably slow. Preferably the coating is heated to a temperature from 100°C to 200°C. Heating of the coating to form aluminium phosphate may be combined with the removal of solvent in a single operation. For example, if ethyl cellosolve is used as the solvent for the complex phosphate, removal of the solvent at its boiling point, namely 135°C, will also effect the heating of the deposit. When, however, the solvent is removed at a temperature of less than 80°C, further heating of the coating at a temperature of at least 80°C is usually necessary to bring about the rapid formation of aluminium phosphate.

It is not essential for the complex phosphate to have been isolated as such before incorporation in the priming composition, and the crude reaction mixture in which the complex phosphate has been produced may be used directly for this purpose if desired.

The application of the priming composition may be repeated if desired so as to build up a priming coating of desired thickness.

The coating composition which is to be applied to the treated surface may be any conventional coating composition, and examples of suitable coating compositions include convertible and non-convertible coatings, for example paints, lacquers, varnishes, enamels, automobile finishes, wire enamels, aqueous emulsion paints and the like, whether intended for decorative, protective or any other purpose. These include coating compositions based on film-formers, for example nitrocellulose, cellulose esters (for example cellulose acetate), cellulose ethers (for example ethyl cellulose); rubbers and chlorinated rubbers; polyolefines and halogenated polyolefines; polymers and copolymers of vinyl chloride, vinylidene chloride, vinyl ethers, vinyl esters (for example vinyl acetate), acrylic monomers (for example the esters, amides and nitriles of acrylic and methacrylic acids) and styrene; natural and synthetic resins, for example shellac, copal, alkyd resins, urea-formaldehyde resins, phenol-formaldehyde resins, melamine-formaldehyde resins, epoxide resins, unsaturated polyester resins; polyamides; polyurethanes; silicone resins; drying and semi-drying oils; and mixtures of these. The coating compositions may be made up with conventional adjuvants, for example solvents, vehicles and thinners; pigments, dyestuffs, lakes and other colouring matters; fillers, opacifiers; plasticisers; driers, thixotropic additives, as desired.

The coating composition may be applied to the treated surface by any convenient method, for example by dipping, spraying or brushing.

The heating step is preferably carried out before the coating composition is applied to the treated surface, so that any undesirable by-products of the decomposition of the complex phosphate (for example hydrogen chloride) can be removed. If the coating composition is thermally stable and sufficiently unaffected by such by-products, however, and especially if the coating composition is one which is cured by heating, the heating step may be carried out after the coating composition has been applied over the deposit of complex phosphate of aluminium produced by application of the priming composition.

The use of the complex phosphate of aluminium according to the process of the present invention provides a tough, adherent film of an aluminium phosphate on the surface of the substrate, to which the coating composition can adhere. This film of aluminium phosphate can be generated without the need for unduly high temperatures and, since it can be deposited from organic media, can be generated in very intimate contact with surfaces which are not readily wetted by aqueous media.

The invention is illustrated by, but not limited to, the following Examples:

EXAMPLE 1

Two aluminium test panels were lightly etched for 5 minutes with 1 N sodium hydroxide, washed with water, immersed in 10 percent by weight aqueous solution of ACPE, and withdrawn at a rate of 9 inches per minute. The panels were heated at 200°C for 30 minutes and painted by immersion in a trichloroethylene-based modified alkyl resin paint (viscosity 22 seconds) and withdrawn at 1 foot per minute. One panel was air-dried whilst the other was stoved at 150°C for 20 minutes. After being subjected to a continuous spray of 5 percent sodium chloride solution, the adhesion of the paint to the pretreated panels was found to be superior to that of un-pretreated panels subjected to the same painting procedure and test conditions.

EXAMPLE 2

After etching and washing as in Example 1, aluminium test panels were coated with 10 percent by weight solution of ACPE in methanol and heated at 120°C for 30 minutes. They were subsequently painted and dried as described in Example 1. After being subjected to salt solution spray, the adhesion of the paint to the pretreated panels was found to be superior to that of un-pretreated painted panels subjected to similar test conditions.

EXAMPLE 3

Two aluminium test panels were degreased with 1,1,1-trichloroethylene and acetone, coated with a 10 percent by weight solution of ACPE in methanol and subsequently treated as in Example 1. The adhesion of the paint to the pretreated panels was found to be superior to that of un-pretreated panels.

EXAMPLE 4

Two aluminium test panels were degreased as in Example 3 and coated with a 10 percent by weight solution of ACPH in water. After heating at 200°C for 30 minutes they were painted and dried as in Example 1. Adhesion of the paint to the pretreated panels was found to be superior to that of un-pretreated panels.

What we claim is:

1. A primed metal substrate comprising a metal surface having thereon a complex halogen-containing phosphate of aluminum containing at least one chemically bound molecule of a hydroxy compound ROH, where R is selected from the group consisting of hydrogen and organic groups containing one to 10 carbon atoms.

2. A coating process in which there is applied to a metal substrate, firstly a complex halogen-containing phosphate of aluminum containing at least one chemically bound molecule of a hydroxy compound ROH, where R is selected from the group consisting of hydrogen and organic groups containing one to 10 carbon atoms, and secondly, a coating composition selected from the group consisting of paints, lacquers, varnishes, enamels and aqueous emulsion paints.

3. A process according to claim 2 in which the halogen is chlorine.

4. A process according to claim 2 in which the ratio of the number of gram atoms of aluminum to the number of gram atoms of phosphorus in the complex is substantially 1:1.

5. A process according to claim 2 in which R is an organic group containing from one to four carbon atoms.

6. A process according to claim 2 in which the complex phosphate of aluminum has the empirical formula $Al\ P\ Cl\ H_{25}C_8O_8$ or $Al\ PCl\ H_{11}O_9$.

7. A process according to claim 2 in which the complex phosphate of aluminum is dissolved in an alcohol.

8. A process according to claim 2 in which there is also present, with the complex phosphate of aluminum, an organic polymer.

9. A process according to claim 2 in which the coated substrate is heated to a temperature of at least 50°C.

* * * * *